US012645941B2

(12) United States Patent
Imai et al.

(10) Patent No.: US 12,645,941 B2
(45) Date of Patent: Jun. 2, 2026

(54) DATA SWAPPING FOR NEURAL NETWORK MEMORY CONSERVATION

(71) Applicant: INTERNATIONAL BUSINESS MACHINES CORPORATION, Armonk, NY (US)

(72) Inventors: Haruki Imai, Yokohama (JP); Tung D. Le, Ichikawa (JP); Yasushi Negishi, Machida (JP); Kiyokuni Kawachiya, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 1068 days.

(21) Appl. No.: 17/089,245

(22) Filed: Nov. 4, 2020

(65) Prior Publication Data

US 2022/0138580 A1 May 5, 2022

(51) Int. Cl.
*G06N 3/084* (2023.01)

(52) U.S. Cl.
CPC .................................... *G06N 3/084* (2013.01)

(58) Field of Classification Search
CPC ............................... G06N 3/084; G06N 3/045
See application file for complete search history.

(56) References Cited

U.S. PATENT DOCUMENTS 11,704,572 B1 * 7/2023 Pronovost .............. G06N 3/084
2010/0088494 A1 * 4/2010 Elnozahy .............. G06F 9/3863

2018/0341852 A1 11/2018 Kawachiya et al.
2019/0286991 A1 * 9/2019 Lee ........................... G06N 3/02
2019/0324856 A1 * 10/2019 Zhao ................... G06F 11/1407
2022/0076097 A1 * 3/2022 Zhao ......................... G06N 3/04
2023/0071424 A1 * 3/2023 Kibardin ................... G06F 9/54

FOREIGN PATENT DOCUMENTS

CN       109919310 B  *  1/2019
CN       109919310 A     6/2019
WO   WO2018158293 A1  *  2/2018   ............. G06N 3/063

OTHER PUBLICATIONS

Yuki Ito, et al. "Profiling Based Out-of-Core Hybrid Method for Large Neural Networks" (Year: 2019).*

(Continued)

*Primary Examiner* — Michelle T Bechtold
*Assistant Examiner* — Matiyas T Maru
(74) *Attorney, Agent, or Firm* — CHIP LAW GROUP

(57) ABSTRACT

Methods and systems for training a neural network include identifying units within a neural network, including a first unit for memory swapping and a second unit for re-computation to balance memory efficiency with computational efficiency. Each unit includes at least one layer of the neural network. Each unit has a first layer that is a checkpoint operation. During a feed-forward training stage, feature maps are stored in a first memory. The feature maps are output by the at least one layer of the first unit. The feature maps are swapped from the first memory to a second memory. During a backpropagation stage, the feature maps for the first unit are swapped from the second memory to the first memory. Feature maps for the second unit are re-computed.

19 Claims, 8 Drawing Sheets

(56) References Cited

OTHER PUBLICATIONS

Narayanan D, Harlap A, Phanishayee A, Seshadri V, Devanur NR, Ganger GR, Gibbons PB, Zaharia M. PipeDream: Generalized pipeline parallelism for DNN training. InProceedings of the 27th ACM symposium on operating systems principles Oct. 27, 2019 (pp. 1-15). (Year: 2019).*

Wahib, Mohamed, et al. "Scaling distributed deep learning workloads beyond the memory capacity with Karma." (Year: 2020).*

Ben-Nun et al., "Demystifying parallel and distributed deep learning: An in-depth concurrency analysis." (Year: 2019).*

Garg, et al. "CRUM: Checkpoint-restart support for CUDA's unified memory." (Year: 2018).*

Harlap et al. "Pipedream: Fast and efficient pipeline parallel dnn training." (Year: 2018).*

Github, "Make huge neural nets fit in memory", https://github.com/cybertronai/gradient-checkpointing. Downloaded Aug. 21, 2020. pp. 1-7.

Ito et al., "Profiling based Out-of-core Hybrid Method for Large Neural Networks", arXiv:1907.05013v1 [cs.LG] Jul. 11, 2019. pp. 1-15.

Meng et al., "Training Deeper Models by GPU Memory Optimization on TensorFlow", 31st Conference on Neural Information Processing Systems. Dec. 4-9, 2017. pp. 1-8.

Tung et al., "Automatic GPU memory management for large neural models in TensorFlow", Proceedings of the 2019 ACM SIGPLAN International Symposium. Jun. 2019. Downloaded on Aug. 21, 2020 from the ACM Digital Library, published by the Association for Computing Machinery. https://dl.acm.org/doi/10.1145/3315573. 3329984. pp. 1-3

Zhang et al., "Efficient Memory Management for GPU-based Deep Learning Systems", arXiv:1903.06631v1 [cs.DC]. Feb. 19, 2019. pp. 1-13.

Github "Saving memory using gradient-checkpointing", Jul. 19, 2019, 08 pages, https://github.com/cybertronai/gradient-checkpointing.

Matzek Sam "Using Tensor Swapping and NVLink to Overcome GPU Memory Limits with TensorFlow", IBM, Mar. 2019, 23 pages.

* cited by examiner

200

DATA SWAPPING FOR NEURAL NETWORK MEMORY CONSERVATION

BACKGROUND

The present invention generally relates to neural network memory management, and, more particularly, to efficiently swapping between graphics processing unit (GPU) memory and central processing unit (CPU) memory.

Neural network processing can be performed using GPUs, which can perform many simple operations in an efficient manner. However, the feed-forward outputs of neural network layers may be stored until they are needed for a subsequent backpropagation step. For large neural network models, for example in deep neural network processing tasks, storing all of the outputs of every layer may impose a significant burden on the GPU's memory.

SUMMARY

A method for training a neural network includes identifying units within a neural network, including a first unit for memory swapping and a second unit for re-computation to balance memory efficiency with computational efficiency. Each unit includes at least one layer of the neural network. Each unit has a first layer that is a checkpoint operation. During a feed-forward training stage, feature maps are stored in a first memory. The feature maps are output by the at least one layer of the first unit. The feature maps are swapped from the first memory to a second memory. During a backpropagation stage, the feature maps for the first unit are swapped from the second memory to the first memory. Feature maps for the second unit are re-computed.

A system for training a neural network includes a hardware central processing unit (CPU) and a CPU memory, configured to store program code that, when executed by the hardware CPU, implements a neural network having multiple layers, neural network training code that trains the neural network using a feed forward stage and a backpropagation stage, and memory management code. During a feed forward state, the neural network training code stores feature maps, output by layers of the neural network, in a first memory. During the backpropagation stage, feature maps that are not stored in the first memory are re-computed. The memory management code identifies units within the neural network, including a first unit for memory mapping and a second unit for re-computation to balance memory efficiency with computational efficiency. Each unit includes at least one layer and each unit of the plurality of units having a first layer that is a checkpoint operation checkpoint operation. The memory management code further swaps feature maps from the first memory to a second memory during the feedforward stage, and swaps feature maps for the first unit from the second memory to the first memory during the backpropagation stage.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

To prevent the memory of graphics processing units (GPUs) from being overfilled with the feature maps of neural network layer outputs, such information may be swapped out to the memory of the central processing unit (CPU). However, while CPU memory may be larger than an individual GPU's memory, there may be many GPUs working at the same time. Thus, to manage the amount of memory that is stored at the CPU, some feature maps may not be swapped, and may instead by recomputed at the time of back-propagation. A balance may therefore be made between the efficiency of swapping feature maps to the CPU memory, and staying within the CPU memory's limits.

Figure 1:
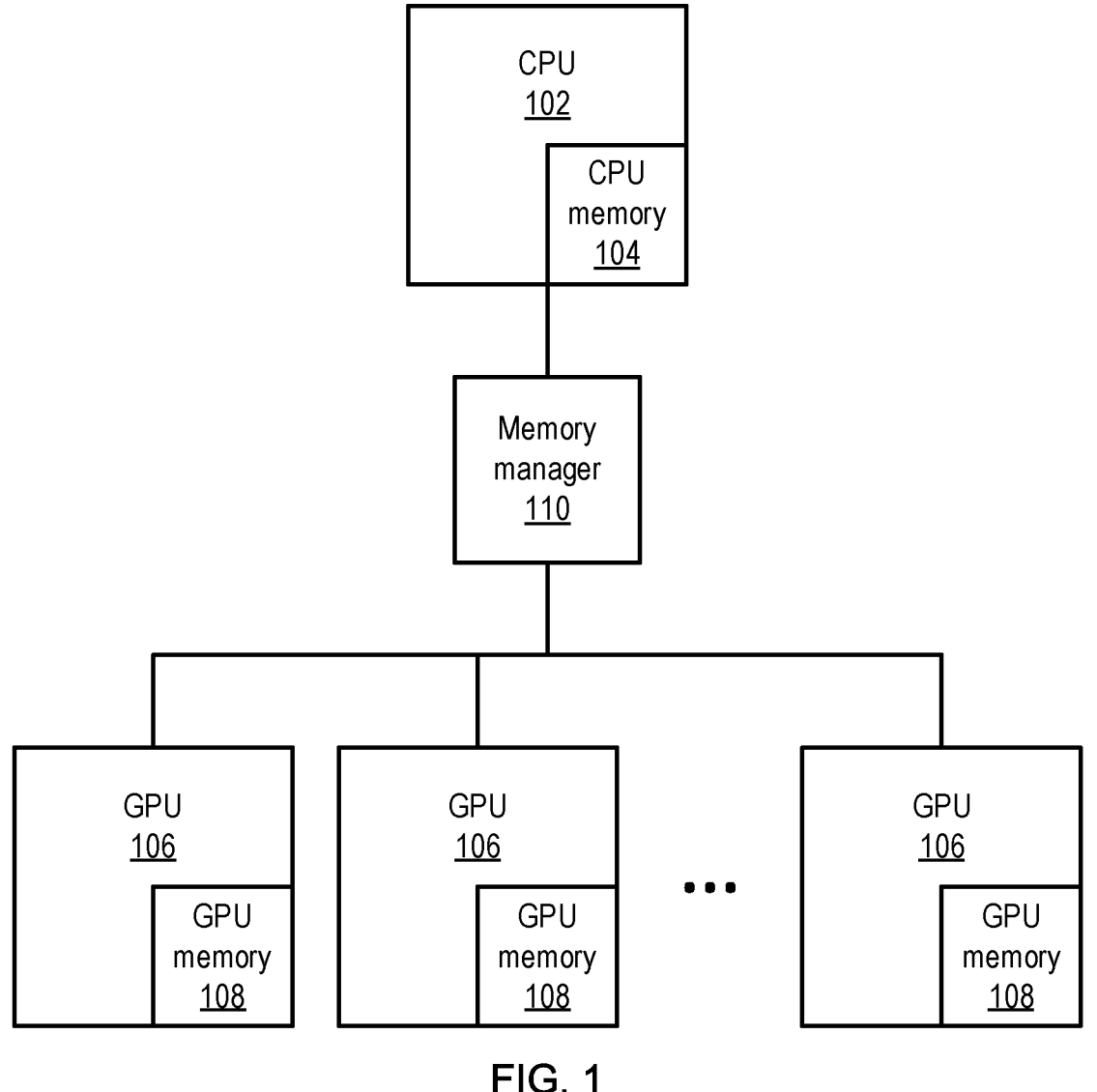
FIG. 1 is a block diagram that shows a hardware processing system with a central processing unit (CPU) and multiple graphics processing units (GPUs) that handle training of a deep neural network machine learning model with memory swapping, in accordance with an embodiment of the present invention.

Referring now to FIG. 1, an overview of a neural network processing system 100 is shown. The system 100 includes a CPU 102 with a CPU memory 104, as well as multiple GPUs 106, each with its own respective GPU memory 108. Each GPU 106 may separately process one or more parts of a neural network, and/or may process an entire neural network in parallel with the other GPUs 106. In the process of performing feedforward neural network computations, the outputs of layers (e.g., feature maps), may be stored in the respective GPU memory 108.

As the GPU memory 108 fills, some or all of the feature maps may be offloaded to CPU memory 104. Then, when the feature maps are needed for back-propagation, they may be recalled to the GPU's local memory 108. However, considering the multiplicity of the GPUs 106, there may be more feature map data than can be stored in the CPU memory 104.

A memory manager 110 determines which feature maps are swapped out to CPU memory 104, and which are simply deleted from GPU memory 108. The memory manager 110 makes a determination of how much space remains in CPU memory 104 and selects feature maps for swapping according to a determination of the amount of space the feature maps would occupy in the CPU memory 104 and the amount of GPU memory 108 that would be used in re-computing the feature map. The memory manager 110 may then determine feature maps in particular GPU memories 108 that may be overwritten and later recomputed.

The neural network model may be implemented as an artificial neural network (ANN), representing an information processing system that is inspired by biological nervous systems, such as the brain. A key element of ANNs is the structure of the information processing system, which includes a number of highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

Figure 2:
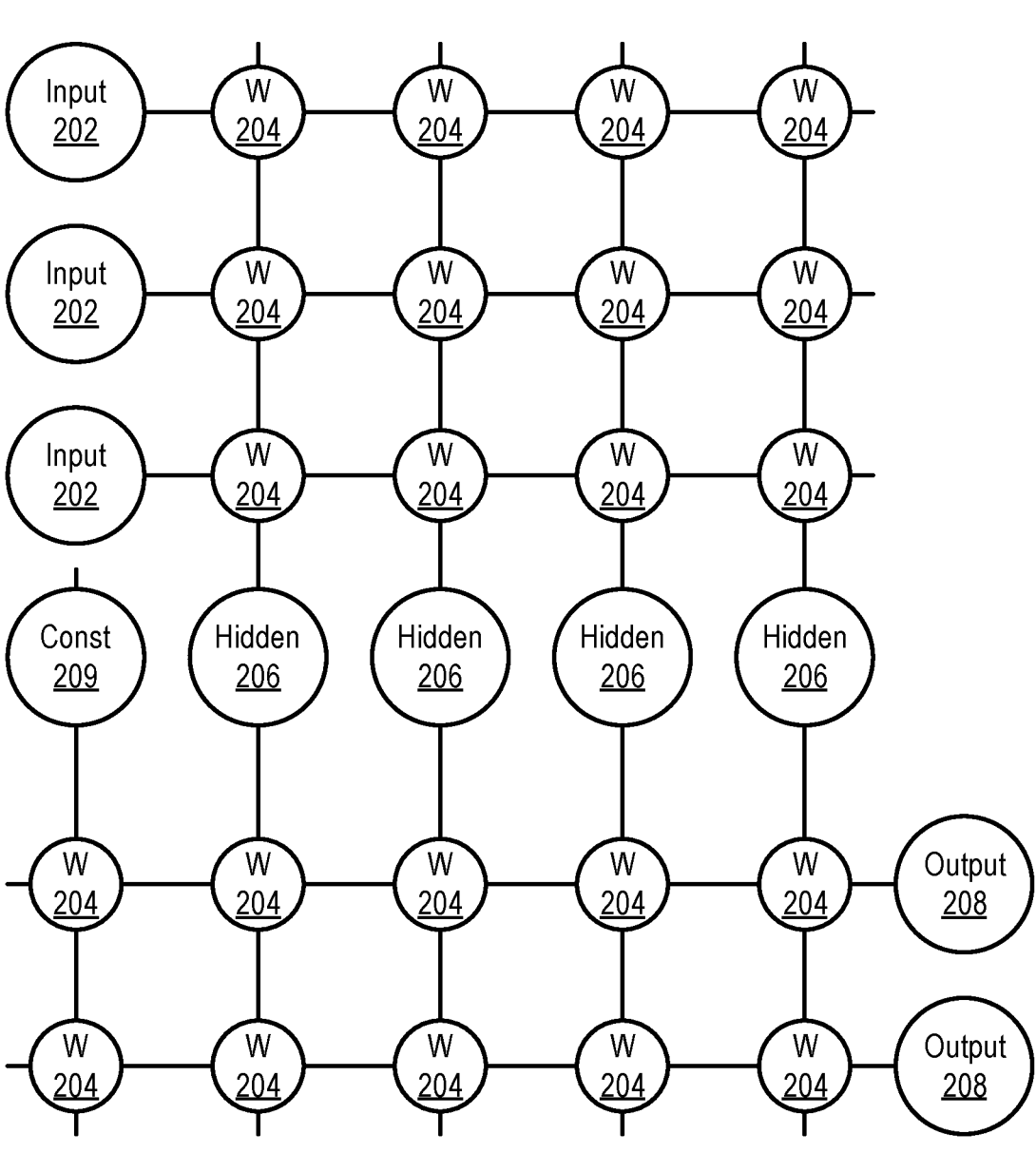
FIG. 2 is a diagram of a general neural network architecture, showing neuron layers and weights between neuron layers, in accordance with an embodiment of the present invention.

Referring now to FIG. 2, an ANN architecture 200 is shown. It should be understood that the present architecture is purely exemplary and that other architectures or types of neural network may be used instead. The ANN embodiment described herein is included with the intent of illustrating general principles of neural network computation at a high level of generality and should not be construed as limiting in any way.

Furthermore, the layers of neurons described below and the weights connecting them are described in a general manner and can be replaced by any type of neural network layers with any appropriate degree or type of interconnectivity. For example, layers can include convolutional layers, pooling layers, fully connected layers, softmax layers, or any other appropriate type of neural network layer. Furthermore, layers can be added or removed as needed and the weights can be omitted for more complicated forms of interconnection.

During feed-forward operation, a set of input neurons 202 each provide an input signal in parallel to a respective row of weights 204. The weights 204 each have a respective settable value, such that a weight output passes from the weight 204 to a respective hidden neuron 206 to represent the weighted input to the hidden neuron 206. In software embodiments, the weights 204 may simply be represented as coefficient values that are multiplied against the relevant signals. The signals from each weight adds column-wise and flows to a hidden neuron 206.

The hidden neurons 206 use the signals from the array of weights 204 to perform some calculation. The hidden neurons 206 then output a signal of their own to another array of weights 204. This array performs in the same way, with a column of weights 204 receiving a signal from their respective hidden neuron 206 to produce a weighted signal output that adds row-wise and is provided to the output neuron 208.

It should be understood that any number of these stages may be implemented, by interposing additional layers of arrays and hidden neurons 206. It should also be noted that some neurons may be constant neurons 209, which provide a constant output to the array. The constant neurons 209 can be present among the input neurons 202 and/or hidden neurons 206 and are only used during feed-forward operation.

During back propagation, the output neurons 208 provide a signal back across the array of weights 204. The output layer compares the generated network response to training data and computes an error. The error signal can be made proportional to the error value. In this example, a row of weights 204 receives a signal from a respective output neuron 208 in parallel and produces an output which adds column-wise to provide an input to hidden neurons 206. The hidden neurons 206 combine the weighted feedback signal with a derivative of its feed-forward calculation and stores an error value before outputting a feedback signal to its respective column of weights 204. This back propagation travels through the entire network 200 until all hidden neurons 206 and the input neurons 202 have stored an error value.

During weight updates, the stored error values are used to update the settable values of the weights 204. In this manner the weights 204 can be trained to adapt the neural network 200 to errors in its processing. It should be noted that the three modes of operation, feed forward, back propagation, and weight update, do not overlap with one another.

The entire depth of the neural network layers may be executed by a single GPU 106, with multiple GPUs 106 running in parallel. To accomplish backpropagation, the output of each layer may be stored as a feature map, for use after feed forward has completed. In ANNs that have many neurons, particularly in those which have a large number of distinct layers, the amount of information to be stored in the GPU memory 108 may exceed the size of the GPU memory 108.

Figure 3:
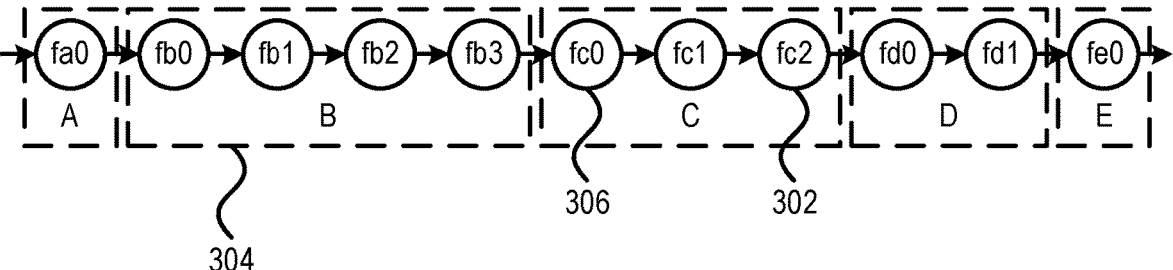
FIG. 3 is a diagram that illustrates the structure of a deep neural network machine learning model, including a number of re-computation units, in accordance with an embodiment of the present invention.

Referring now to FIG. 3, a simplified ANN structure is shown. A series of neural network layers 302 is shown, with processing starting in this case at layer fa0 and ending after layer fe0. Each of the layers 302 may represent a respective operation, which may be defined by an activation function of the neurons of the layer and the weights between the layer and the previous layer. In deep neural network architecture, there may be many such layers, each with its own respective feature map output.

The layers 302 are broken up into a set of re-computation units 304, labeled herein as A, B, C, D, and E. Layers 302 may be assigned to re-computation units 304 according to the respective operations that are performed. For example, convolutional operations may be resource intensive, and so may be selected as a checkpoint operation. The feature map outputs of the checkpoint operations may be preserved in GPU memory 108, even in the event that a re-computation unit 304 is set for re-computation, to prevent the resource-intensive checkpoint operation from being repeated.

Thus, each sequence of layers that starts with a checkpoint operation may be set as a respective re-computation unit 304. For each re-computation unit 304, the layers 302 after the checkpoint operation 306 may be considered for swapping to CPU memory 104 or for re-computation. In some cases, the outputs of the checkpoint operations 306 may be kept in GPU memory 108, as it may be particularly computationally expensive to recreate those feature maps. The saved feature maps from the checkpoint operation 306 may be used as inputs to the following layers 302 to recompute the feature maps of the other operations in the re-computation unit 304.

In some cases, a re-computation unit 304 may include only a single layer—the checkpoint operation 306. In such cases, there are no layers that are candidates for swapping or re-computation. In other cases, a re-computation 304 may have many swappable layers 302 after the checkpoint operation 306. The sizes of feature map outputs of the swappable layers 302 for a given re-computation unit 304 are added together to determine the amount of memory that can be removed from the GPU memory 108, for example by swapping to CPU memory 104 or by deleting the feature maps from GPU memory 108.

Figure 4:
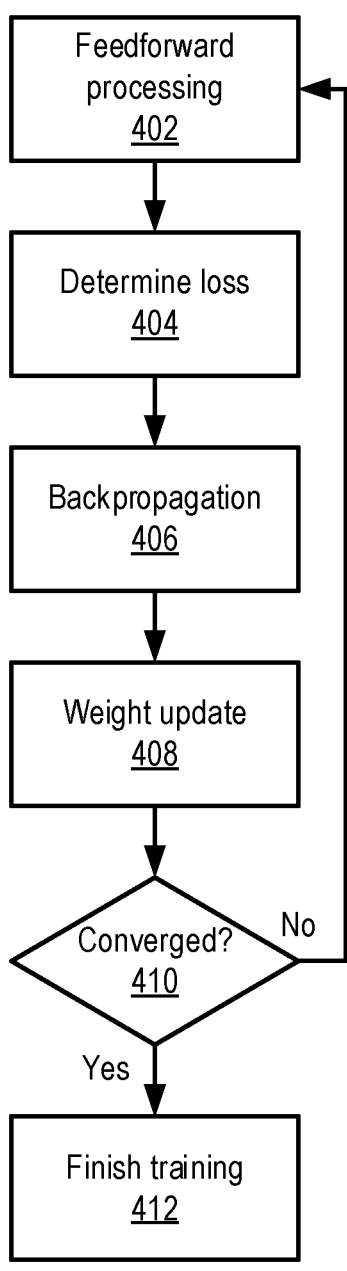
FIG. 4 is a block/flow diagram of a method for training a neural network using efficient memory swapping between GPU memory and CPU memory, in accordance with an embodiment of the present invention.

Referring now to FIG. 4, a process of training an ANN is shown. The process makes uses of a training dataset, which includes a set of inputs and a set of respective known outputs. Block 402 performs a feed forward operation using an input from the dataset. At each layer 302 of the ANN, a feature map is generated that is used as the input to the next layer 302. As will be described in greater detail below, the feed forward operation includes a determination of whether to swap the feature map from the GPU memory 108 to the CPU memory 104, or whether to instead mark the feature map for re-computation.

Block 406 uses the output of the last layer in the ANN to determine an error value, for example using a loss function, representing a difference between the computed output and the expected known output. This error value can then be propagated back through the ANN, generating weight update values that change how the output of one layer is presented as input to the next layer. Block 408 applies these update values.

Block 410 determines whether the training has converged, for example by determining whether the error value has fallen below a threshold value, or by determining that the error value has not changed significantly from one iteration to the next. In some cases, block 410 may instead determine whether the entire training dataset has been used. Once block 410 indicates that no more training iterations will be performed, block 412 finishes the training, storing the weight values. When the ANN is later used for, e.g., image classification or any other appropriate task, a fresh input is propagated through the layers of the ANN to generate an output.

Figure 5:
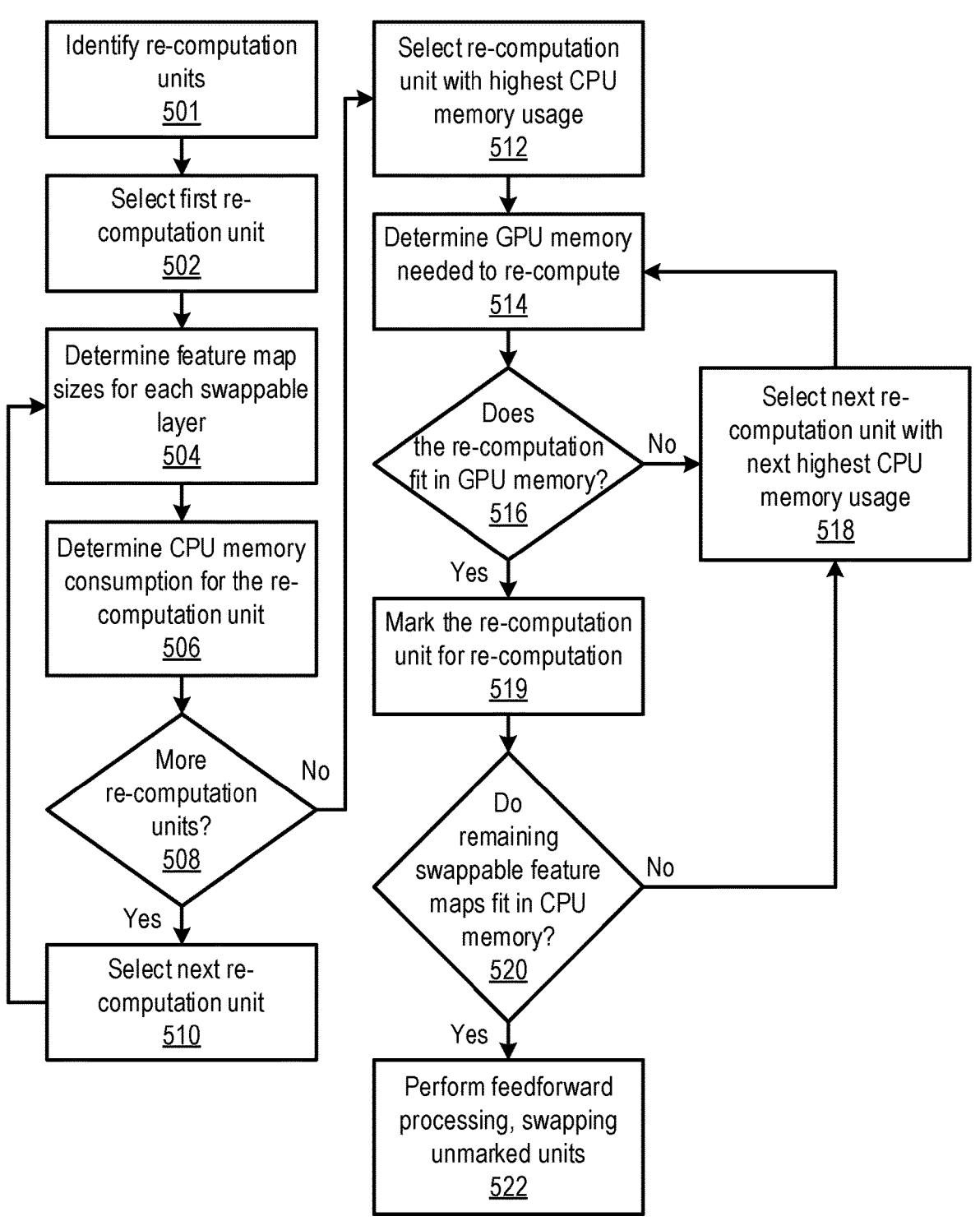
FIG. 5 is a block/flow diagram of a method for identifying feature maps for re-computation and for swapping from GPU memory to CPU memory, in accordance with an embodiment of the present invention.

Referring now to FIG. 5, additional detail on the feed forward step 402 is shown. Block 501 analyzes the structure of the ANN in question, identifying re-computation units 304 in accordance with a checkpoint operation 306. The checkpoint operation 306 may be predetermined, or may be selected in accordance with re-computation resources. For each checkpoint operation 306 in the ANN's structure, block 501 defines a respective re-computation unit 304, with any swap-eligible layers being identified within each re-computation unit 304. Block 502 then selects the first re-computation unit in the ANN.

Block 504 determines the feature map size for the output of each swappable layer in the re-computation unit 304. For example, the swappable layers may include any layer in the re-computation unit 304 after the checkpoint operation layer 306. Block 506 determines an amount of CPU memory 104 that would be needed to store each swappable layer in the re-computation unit 304. Block 508 then determines whether there are any further re-computation units 306 to consider. If so, block 510 selects a next re-computation unit, and processing returns to block 504.

If the CPU memory demand has been calculated for each swappable layer in each re-computation unit 304, then processing proceeds to block 512. Block 512 selects a re-computation unit with the highest CPU memory usage, from the combined values of each swappable layer in the re-computation unit. Block 514 then determines the amount of GPU memory 108 needed to re-compute the feature maps of all of the swappable layers in the selected re-computation unit.

Block 516 determines whether the feature maps of all the swappable layers in the selected re-computation unit will fit in GPU memory 108. If not, block 518 selects a next re-computation unit with the next-highest CPU memory usage, and processing returns to block 514.

If the feature maps of the swappable layers in the selected re-computation unit do fit in GPU memory 108, then block 519 marks the re-computation unit for re-computation. Block 520 determines whether the swappable feature maps of any remaining re-computation units all fit within the CPU memory 104. In a system with multiple GPUs 106, GPU 106 may be allocated a predetermined percentage of the CPU memory 104 for swapping purposes, and block 520 determines whether the remaining swappable feature maps will fit within that predetermined amount of memory. If not, block 518 selects a next re-computation unit with the next-highest CPU memory usage, and processing returns to block 514.

If so, block 522 performs feedforward processing in the ANN. For each re-computation unit that is marked for re-computation, the feature maps are discarded after they are used as input for the next layer in the ANN. For the remainder of the re-computation units, any swappable layers are swapped out of GPU memory 108 and into CPU memory 104 after they are used as input to the next layer.

Figure 6:
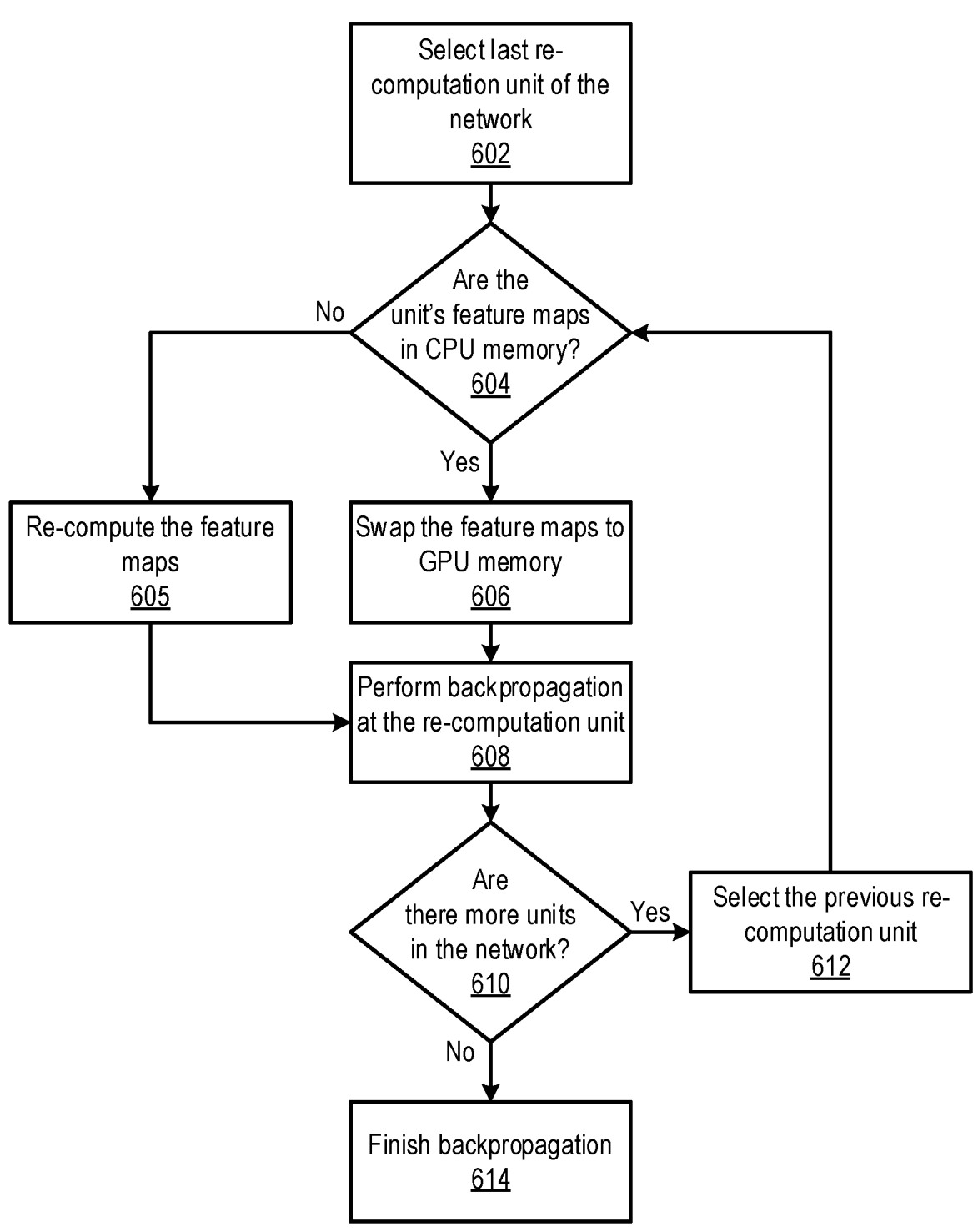
FIG. 6 is a block/flow diagram of a method for a backpropagation stage of training a neural network, swapping feature maps from CPU memory to GPU memory and re-computing feature maps, in accordance with an embodiment of the present invention.

Referring now to FIG. 6, additional detail on the backpropagation of block 406 is shown, including handling swapped and re-computed feature maps. Block 602 selects the last re-computation unit of the ANN, as backpropagation traverses the network in reverse. Block 604 then determines whether the feature maps for that re-computation unit are stored in CPU memory 104. If not, block 605 re-computes the feature maps of the re-computation unit, starting from the checkpoint operation. If so, block 606 swaps the feature maps back from CPU memory 104 to GPU memory 108. Block 608 can then perform backpropagation through the layers of the selected re-computation unit.

Block 610 determines whether there are additional re-computation units in the ANN to backpropagate through. If so, block 612 selects the previous re-computation unit, working backwards through the ANN, and processing returns to block 604. If not, block 614 completes the backpropagation process, such that a weight update in block 408 may be performed.

Figure 7:
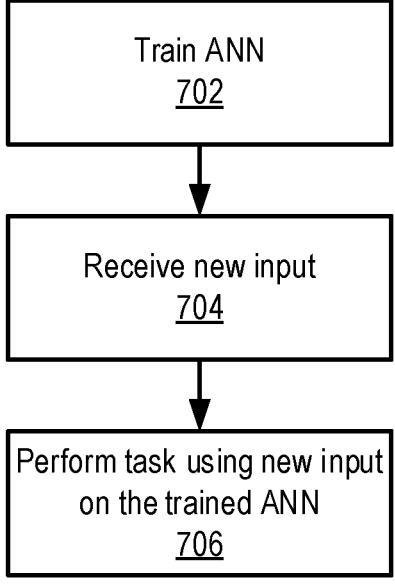
FIG. 7 is a block/flow diagram of a method of training a neural network and of using the trained neural network to perform a machine learning task, in accordance with an embodiment of the present invention.

Referring now to FIG. 7, a high-level process for training and using an ANN is shown. Block 702 trains the ANN, for example using selective memory swapping between GPU memory 108 and CPU memory 104 to improve the efficiency of the training process. Block 704 then receives a new input, and block 706 uses the new input on the trained ANN to perform some task.

It should be understood that the training can be used for an ANN that is configured to perform any appropriate kind of task. Examples include classification tasks, natural language processing tasks, image tasks (such as object detection and segmentation), and any other kind of machine learning or reasoning task. For example, a task may include a computer vision task, where convolutional neural network layers are often used to process two-dimensional graphical information. When a deep neural network is used in such a task, the memory cost of preserving all of the feature maps of all of the layers may exceed a size of an individual GPU memory 108. Following this example, there may be multiple such camera inputs, each of which may be trained using a different set of training data (e.g., a front-view camera and a side-view camera), for example using different GPUs 106 in parallel.

Additionally, it should be understood that training need not be a one-time occurrence, but may be updated over time, as new inputs become available. Thus, systems that are adaptive to new inputs, but which may have limited hardware resources available, may be re-trained using the new inputs, without exceeding the memory constraints of the hardware.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and second listed options (A and B) only, or the selection of the first and third listed options (A and C) only, or the selection of the second and third listed options (B and C)

only, or the selection of all three options (A and B and C). This may be extended, as readily apparent by one of ordinary skill in this and related arts, for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
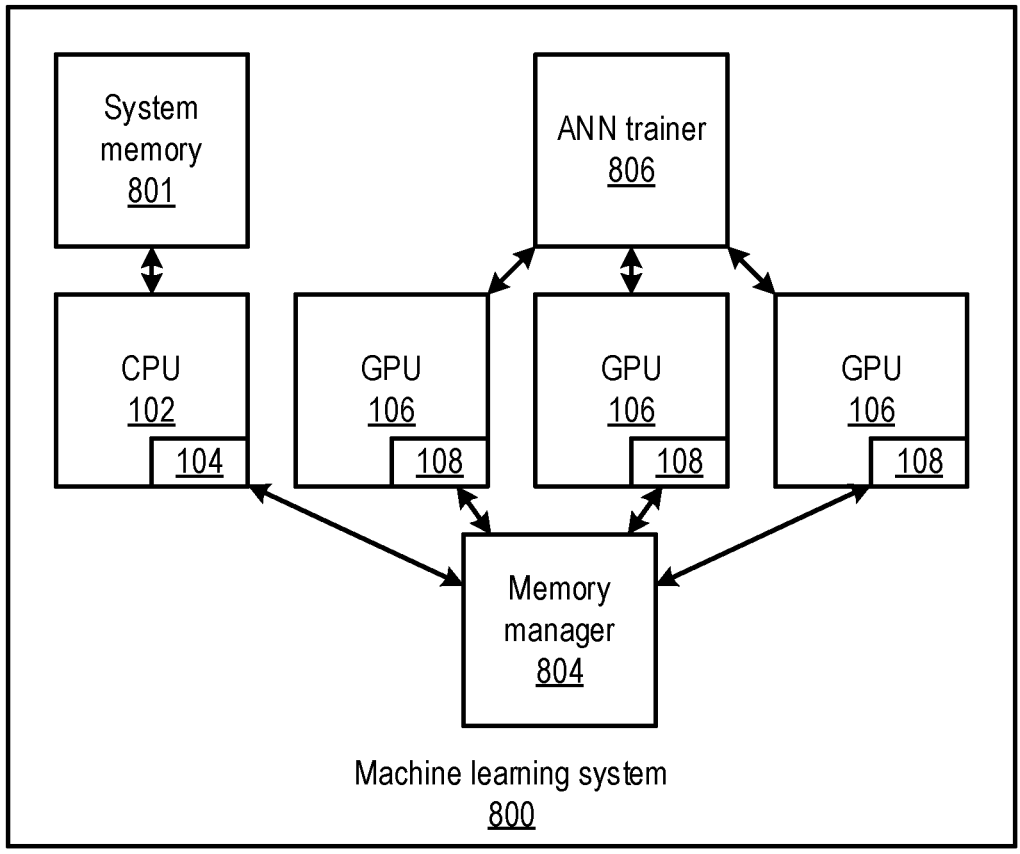
FIG. 8 is a block diagram of a machine learning system, including a neural network trainer and memory management that efficiently swaps information between GPU memory and CPU memory, in accordance with an embodiment of the present invention.

Referring now to FIG. 8, a machine learning system 800 is shown. The systems 800 includes a CPU 102 and one or more GPUs 106. The CPU 102 has a CPU memory 104, and each GPU 106 has a respective GPU memory 108. It is specifically contemplated that the CPU memory 104 and the GPU memories 108 may each be implemented as a respective cache memory, but it should be understood that other memories may also be used, such as system memory or on-board GPU memory. The CPU memory 104 in particular may include system memory 801, such as RAM, or that memory may be represented separately.

A memory manager 804 swaps memory between the GPU memories 108 and the CPU memory 104, as described above. An ANN trainer 806 performs feed forward and backpropagation training of the ANN model that is implemented on each of the GPUs 106. It should be understood that the memory manager 804 and the ANN trainer 806 may each implemented as software code that is stored in system memory 801 and that is executed by CPU 102, may be implemented as one or more discrete hard hardware components, or may be implemented as a combination of software and hardware.

The CPU 102 may be any form of hardware processor, and may include any single- or multi-core processing technology. The GPUs 106 may similarly be hardware processors that use any appropriate GPU technology, or may be another kind of processing technology, for example a highly parallel architecture that is designed to perform neural network operations. The CPU and GPU memories may be caches that are tightly integrated with the respective hardware processors.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Having described preferred embodiments of data swapping for neural network memory conservation (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method for training a neural network, comprising:
identifying a plurality of re-computation units, each being a set of one or more layers of a neural network, each re-computation unit of the plurality of re-computation units including a different respective set of layers of the neural network and at least one re-computation unit of the plurality of re-computation units having a plurality of layers, and each re-computation unit of a plurality of re-computation units beginning with a checkpoint operation that is implemented by a first layer of the set of one or more layers and that is selected according to computational costs associated with the checkpoint operation;
during a feed-forward training stage:
storing feature maps, output by the at least one layer of a first re-computation unit of the plurality of re-computation units, by a checkpoint operation of a second re-computation unit of the plurality of re-computation units, and by at least one additional operation of the second re-computation unit selected according to sizes of feature map outputs associated with the at least one additional operation, in a first memory; and
during a backpropagation stage:
re-computing feature maps for the second re-computation unit of the plurality of re-computation units, other than the checkpoint operation of the second re-computation unit and the at least one additional operation of the second re-computation unit.

2. The method of claim 1, further comprising determining that the second re-computation unit is to be re-computed, before the feed-forward training stage, and deleting swappable feature maps of the second re-computation unit from the first memory during the feed-forward stage.

3. The method of claim 2, wherein determining that the second re-computation unit is to be re-computed includes determining a total swappable re-computation unit memory consumed by the feature maps of each non-checkpoint layer in each of the plurality of re-computation units.

4. The method of claim 3, wherein determining that a second re-computation unit is to be re-computed further includes determining that the total swappable re-computation unit memory for the second re-computation unit fits within a predetermined memory allocation of the second memory.

5. The method of claim 3, wherein determining that a second re-computation unit is to be re-computed further includes selecting the re-computation unit from the plurality of re-computation units that has the highest total swappable re-computation unit memory, as determined by a combined feature map size of every layer in the re-computation unit after the checkpoint operation.

6. The method of claim 3, wherein determining that the second re-computation unit is to be re-computed further includes determining that a combined size of feature maps output by swappable layers in the second re-computation unit fits within the first memory.

7. The method of claim 1, wherein swapping feature maps from the first memory to a second memory swaps feature maps that are output by every layer of the first re-computation unit except for a feature map that is output by the checkpoint operation of the first re-computation unit.

8. The method of claim 1, wherein the first memory is a hardware memory that is associated with a central processing unit (CPU) and the second memory is a distinct hardware memory associated with a graphics processing unit (GPU).

9. The method of claim 1, a combined feature map size of every layer, from all of the plurality of re-computation units within the neural network, exceeds a size of the second memory.

10. The method of claim 1, wherein identifying the plurality of re-computation units includes identifying checkpoint layers within the neural network as first layers within each respective re-computation unit and further includes assigning layers to the plurality of re-computation units according to a re-computation unit associated with a closest previous checkpoint layer.

11. A non-transitory computer readable storage medium comprising a computer readable program for training a neural network, wherein the computer readable program when executed on a computer causes the computer to:

identify a plurality of re-computation units, each being a set of one or more layers of a neural network, each re-computation unit of the plurality of re-computation units including a different respective set of layers of the neural network and at least one re-computation unit of the plurality of re-computation units having a plurality of layers, and each re-computation unit of a plurality of re-computation units beginning with a checkpoint operation that is implemented by a first layer of the set of one or more layers and that is selected according to computational costs associated with the checkpoint operation;

during a feed-forward training stage:

store feature maps, output by the at least one layer of a first re-computation unit of the plurality of re-computation units, by a checkpoint operation of a second re-computation unit of the plurality of re-computation units, and by at least one additional operation of the second re-computation unit selected according to sizes of feature map outputs associated with the at least one additional operation, in a first memory; and during a backpropagation stage:

re-compute feature maps for the second re-computation unit of the plurality of re-computation units, other than the checkpoint operation of the second re-computation unit and the at least one additional operation of the second re-computation unit.

12. A system for training a neural network, comprising:

a hardware central processing unit (CPU); and a CPU memory, configured to store program code that, when executed by the hardware CPU, implements:

a neural network having a plurality of layers;

memory management code that identifies a plurality of re-computation units, each being a set of one or more layers of the neural network, each re-computation unit of the plurality of re-computation units including a different respective set of layers and at least one re-computation unit of the plurality of re-computation units having a plurality of layers, and each re-computation unit of the plurality of re-computation units beginning with a checkpoint operation that is implemented by a first layer of the set of one or more layers and that is selected according to computational costs associated with the checkpoint operation; and neural network training code that trains the neural network using a feed forward stage, where the neural network training code stores feature maps, output by a first re-computation unit of the plurality of re-computation units, by a checkpoint operation of a second re-computation unit of the plurality of re-computation units, and by at least one additional operation of the second re-computation unit selected according to sizes of feature map outputs associated with the at least one additional operation, in a first memory, and a backpropagation stage, where feature maps for the second-re-computation unit other than the checkpoint operation and the at least one additional operation of the second re-computation unit are re-computed.

13. The system of claim 12, wherein the memory management code further determines that the second re-computation unit is to be re-computed, before the feed-forward training stage, and deletes swappable feature maps of the second re-computation unit from the first memory during the feed-forward stage.

14. The system of claim 13, wherein the memory management code further determines a total swappable re-computation unit memory consumed by the feature maps of each non-checkpoint layer in each of the plurality of re-computation units.

15. The system of claim 14, wherein the memory management code further determines that the total swappable re-computation unit memory for the second re-computation unit fits within a predetermined memory allocation of the second memory.

16. The system of claim 14, wherein the memory management code further selects the second re-computation unit as being the re-computation unit from the plurality of re-computation units that has the highest total swappable re-computation unit memory, as determined by a combined feature map size of every layer in the re-computation unit after the checkpoint operation.

17. The system of claim 14, wherein the memory management code further determines that a combined size of feature maps output by swappable layers in the second re-computation unit fits within the first memory.

18. The system of claim 12, wherein the memory management code swaps every feature map that is output by every layer of a first re-computation unit from the first memory to the second memory, except for a feature map that is output by the checkpoint operation of the first re-computation unit.

19. The system of claim 12, wherein the first memory is a hardware memory that is associated with the CPU and the second memory is a distinct hardware memory that is associated with a graphics processing unit (GPU).

\* \* \* \* \*